(No Model.)

S. S. MUNSON.
PLUMB LEVEL.

No. 577,386.  Patented Feb. 16, 1897.

WITNESSES:
J. C. Shaw
J. Edw. Luckett

INVENTOR
S. S. Munson,
BY
O'Meara & Co.
ATTORNEYS

THE NORRIS PETERS CO., PHOTO-LITHO., WASHINGTON, D. C.

UNITED STATES PATENT OFFICE.

SYLVESTER S. MUNSON, OF SWANTON, OHIO, ASSIGNOR OF ONE-HALF TO A. B. LATHROP, OF SAME PLACE.

PLUMB-LEVEL.

SPECIFICATION forming part of Letters Patent No. 577,386, dated February 16, 1897.

Application filed January 28, 1896. Renewed December 26, 1896. Serial No. 617,094. (No model.)

*To all whom it may concern:*

Be it known that I, SYLVESTER S. MUNSON, residing at Swanton, in the county of Fulton and State of Ohio, have invented a new and Improved Plumb-Level, of which the following is a specification.

My invention relates to plumb or leveling devices, and it primarily seeks to provide a device of this character, of a very economical and simple construction, which is so connected with the stock that it will effectively operate for its intended purposes, no matter whether the stock is set on the ends or on the sides.

My invention also has for its object to provide a device which can be readily connected to a surveyor's telescope in such a manner as to indicate the rise or fall in inches in every two hundred feet or the usual distance a surveyor sets his stakes on a grade.

With other minor objects in view, which hereinafter will be referred to, the invention consists in a device for the purposes stated constructed in the manner hereinafter first described in detail and then specifically pointed out in the appended claim, reference being had to the accompanying drawings, in which—

Figure 1:
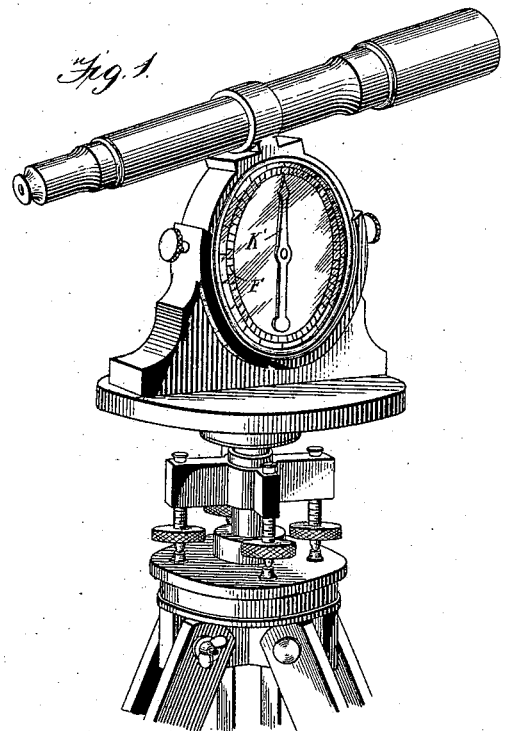
Figure 2:
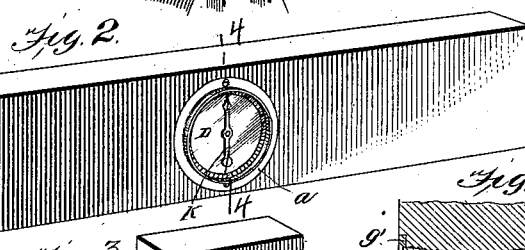
Figure 5:
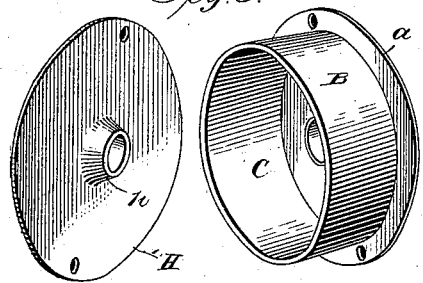
Figure 3:
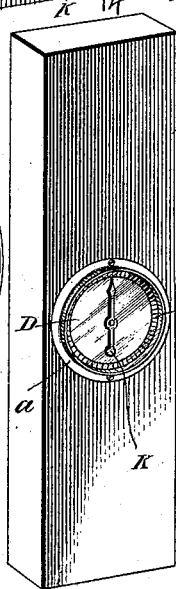
Figure 4:
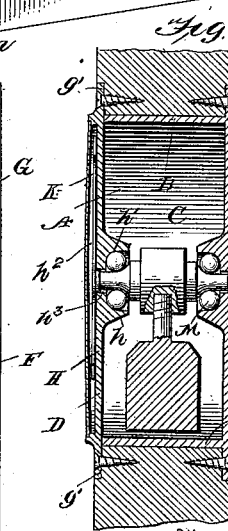
Figure 6:
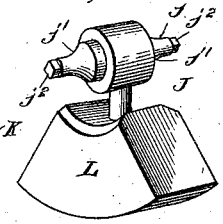

Figure 1 is a perspective view of a surveying instrument with my improvement applied. Fig. 2 is a perspective view of my improvement constructed for use as an ordinary plumb or level, the stock being shown as resting on one of its edges. Fig. 3 is a similar view illustrating my improvement as in use when the stock is set on end. Fig. 4 is a transverse section taken on the line 4 4 of Fig. 2. Fig. 5 is a detail view of the members forming the casing for the pivoted bob or indicator. Fig. 6 is a detail perspective view of the bob or weight member.

In the practical construction my invention comprises a metallic casing formed of a cylindrical shell member A, having a closed end provided with an annular rim $a$ at one end and an internal boss or housing B, which surrounds the central aperture C, and which at its inner end has an annular seat or recess for a purpose presently explained. The outer face of the member B is preferably made solid, with an annular seat to receive a glass cap D, which forms the covering for the indicator-space E, which when my improvement is used as an ordinary plumb-level has an annular scale portion F, which in the present instance is divided into quadrants, which are marked and spaced off in the manner clearly shown in the drawings.

The shell member A fits a circular opening in the stock G, which at one side has an annular recess $g$ surrounding the said opening, which is adapted to receive the flange $a$ of the casing and thereby admit of the solid end of the casing edge A being held flush with the stock-face, such stock member also having an annular seat $g'$ on its opposite face to receive a disk H, which is adapted to form the opposite closing portion for the casing A and which has a hub portion $h$, having a seat $h,'$ an exterior dial-space $h^2$, and a central aperture $h^3$, all arranged and constructed in the same manner as the coincident parts of the shell member A.

J indicates the bob or gravity member, the construction of which is most clearly shown in Fig. 6, and which consists of a shaft $j$, having beveled bearing portions $j'$, when the ends which terminate in reduced shaft portions $j^2$, which extend out each side through the apertures in the ends of the casing and which carry the indicator-fingers K K.

L indicates the weight portion, secured centrally to the shafts $j$.

By referring now more particularly to Fig. 4 it will be observed that the shaft portions $j^2$ are of a less diameter than the opening in the bosses in the outer ends of the casing, and such shafts are held upon ball-bearings M, the balls fitting the sockets or seats in the inner end of the bosses formed on the inner faces of the ends of the casing and against the bevel bearing portion $j'$ of the shaft. It will thus be seen that by suspending the bob within the casing in the manner shown, no matter in which way the stock may be held, the hand K will point in a vertical direction. It will therefore be manifest that a plumb-stock provided with my improvement can be used to determine the level by applying either edge or either end thereof to the body to be leveled. By providing the dial with degrees spaced off in quadrants it will be apparent that if the level have either edge up or either end up the hands will always point to the plumb-line, and as there is a dial-face on each side of the stock the incline level of the body to be leveled can be ascertained, no matter to which side the stock may be turned.

In Fig. 1 I have illustrated my improvement applied to a surveyor's instrument. In this case the dial is spaced off with the usual degrees and with an additional spacing to indicate the rise or fall in inches, such as is usually found on surveyors' indicators. In this construction it will be understood that the plumb-shaft will have a ball-bearing in the rigid portion secured to the frame, and the dial members held to turn on the shaft of the bob and secured to the telescope, so that as the said telescope is tilted the rise or fall in inches will be indicated by the vertically-projected hand K'. Thus by providing the telescope with a leveling device constructed in accordance with my invention, as shown, the surveyor can readily by a glance see that the dial on the compass will tell the number of inches there is in every two hundred feet rise or fall, thereby enabling him to complete his work in much less time than ordinarily required.

Having thus described my invention, what I claim, and desire to secure by Letters Patent, is—

A plumb or level comprising a stock having a circular opening, a circular casing fitted in said opening, said casing having one end made integral therewith, the opposite end or face being detachable, and carrying a dial upon the outer side, a shaft journaled centrally in the casing, and carrying a pointer on one end, said shaft being large at the center and reduced at each end, and having bearing-shoulders, the ball-bearings, and the grooved seats formed upon the faces of the casing and adapted to receive the ball-bearings, and the plumb-weight secured to the central portion of shaft, all arranged substantially as shown and described.

SYLVESTER S. MUNSON.

Witnesses:
W. A. SCOTT, Jr.,
LYMAN W. NORTHRUP.